United States Patent [19]

Curci

[11] Patent Number: 4,765,470
[45] Date of Patent: Aug. 23, 1988

[54] FISHING TACKLE BOX

[76] Inventor: William Curci, 3820 20th St., NW., Canton, Ohio 44708

[21] Appl. No.: 804,886

[22] Filed: Dec. 5, 1985

[51] Int. Cl.⁴ .............................................. B65D 85/00
[52] U.S. Cl. ................... 206/315.11; 224/252; 224/253; 224/920; 43/54.1; 312/328; 312/329
[58] Field of Search ............... 206/315.11, 387, 372, 206/373, 374, 375, 579; 220/338, 340, 342, 343; 224/252, 253, 920; 211/78, 81, 150, 168, 170, 171, 173; 312/120, 123, 136, 328, 327, 326, 329; 43/54.1

[56] References Cited

U.S. PATENT DOCUMENTS

| D. 140,590 | 3/1945 | Glass | 312/329 |
|---|---|---|---|
| 405,003 | 6/1889 | Blackledge | 312/123 |
| 793,451 | 6/1905 | Lindsay et al. | 211/150 |
| 969,620 | 9/1910 | Hewgel et al. | 312/328 |
| 1,625,920 | 4/1927 | Thurman | 224/920 |
| 2,092,430 | 9/1937 | Stratton | 211/150 |
| 2,307,073 | 1/1943 | Powell | 312/328 |
| 2,342,477 | 2/1944 | Magnewat | 220/338 |
| 2,605,926 | 8/1952 | Casey | 220/338 |
| 2,663,608 | 12/1953 | Schauer | 312/329 |
| 2,732,581 | 1/1956 | Heck | 220/338 |
| 3,277,599 | 10/1966 | Griffeth | 224/920 |
| 3,297,192 | 1/1967 | Swett | 220/338 |
| 3,638,843 | 2/1972 | Ortywski | 224/920 |
| 3,754,639 | 8/1973 | Gellert | 206/387 |
| 3,962,750 | 6/1976 | Buss et al. | 220/342 |
| 4,029,234 | 6/1977 | Johnson, Jr. et al. | 220/338 |
| 4,084,865 | 4/1978 | Joyce | 312/DIG. 33 |
| 4,204,608 | 5/1980 | Gatto | 220/343 |
| 4,209,114 | 6/1980 | Wilson et al. | 220/338 |
| 4,323,181 | 4/1982 | Spasoff | 224/920 |
| 4,540,090 | 9/1985 | Gelardi et al. | 220/338 |

FOREIGN PATENT DOCUMENTS

| 909887 | 7/1949 | Fed. Rep. of Germany | 312/DIG. 33 |
| 157182 | 12/1956 | Switzerland | 312/DIG. 33 |

Primary Examiner—David T. Fidei
Attorney, Agent, or Firm—Frease & Bishop

[57] ABSTRACT

A fishing tackle box which is preferably constructed of moldable lightweight material such as plastic, in which the box includes a plurality of hinge-mounted drawers which are operable from open to closed position, in which positive latches are incorporated to hold the drawers in closed position, in which the drawers may be moved from open to closed position with one hand of a user, in which the drawers are easily interchangeable with similar drawers so that spare drawers may be substituted for and interchanged with those mounted in the tackle box without changing the contents of the drawers.

7 Claims, 2 Drawing Sheets

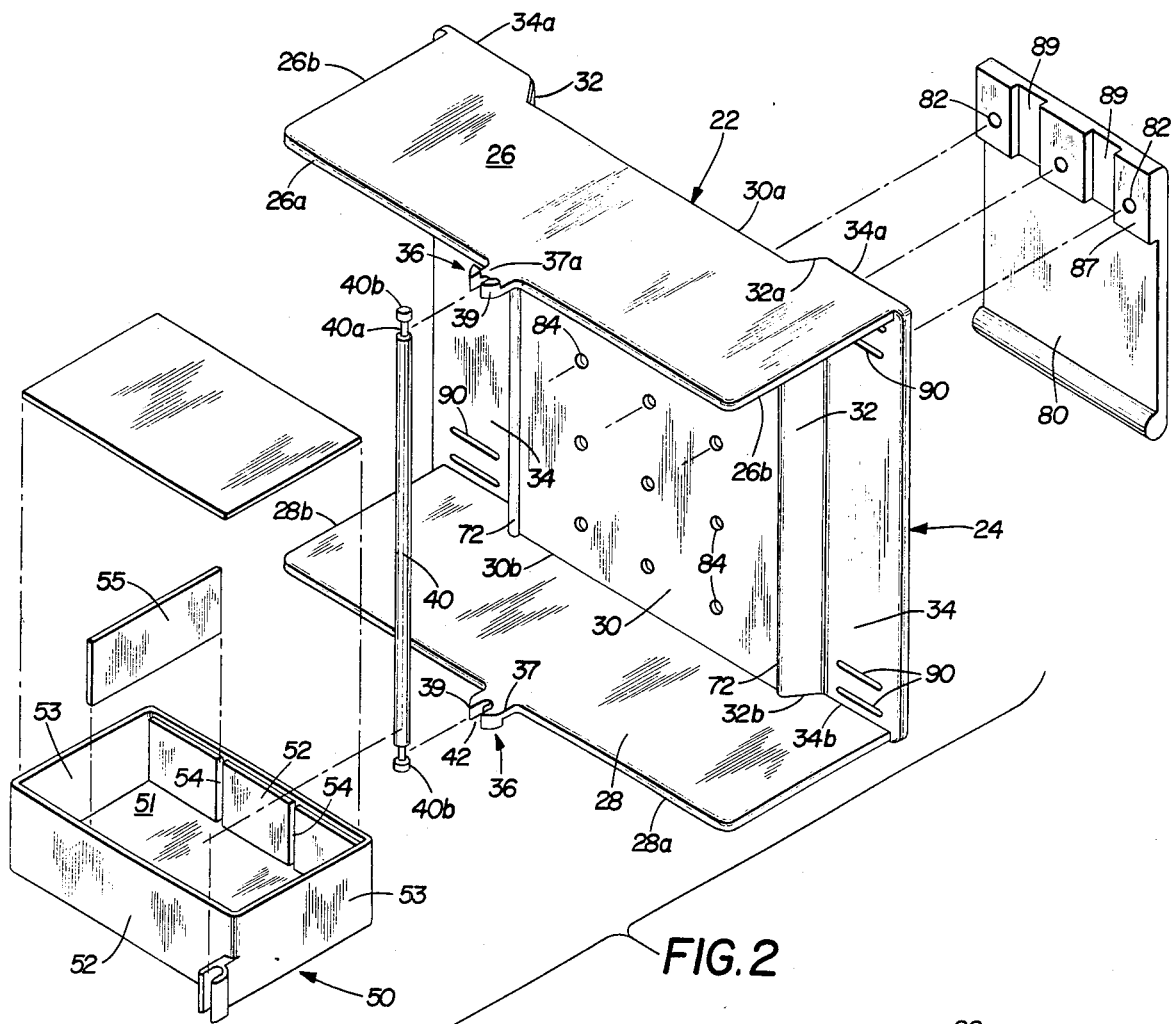
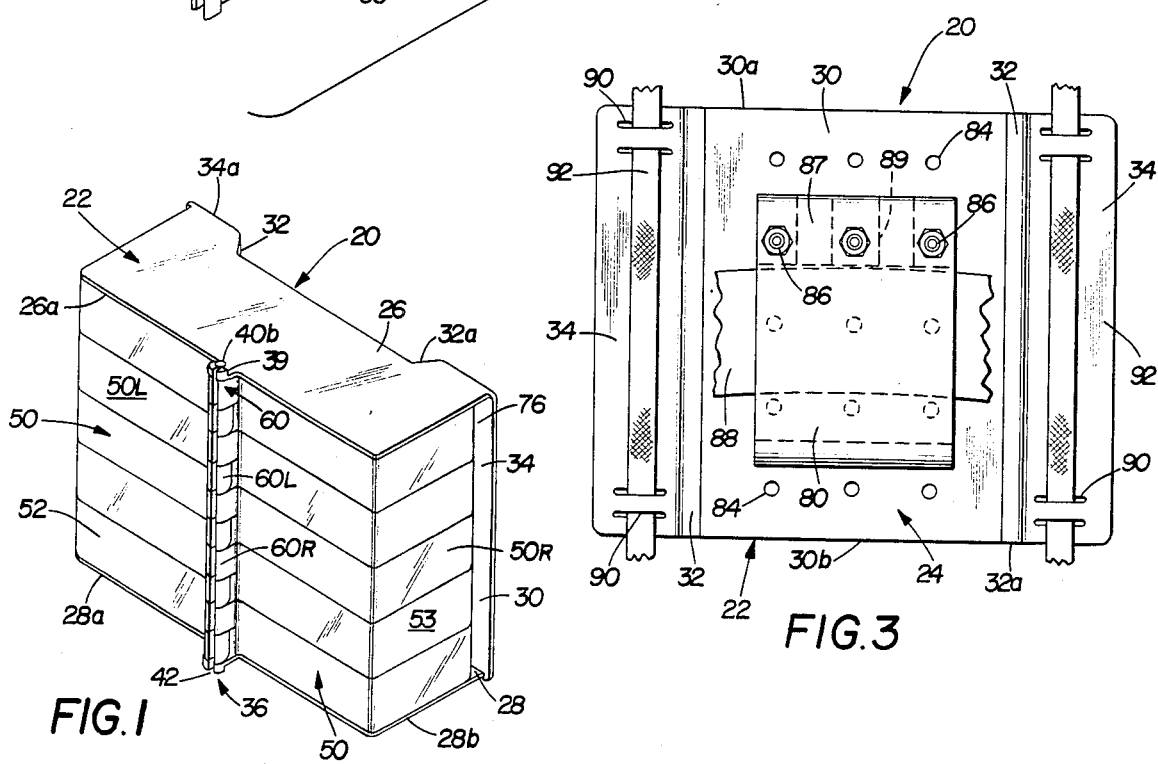

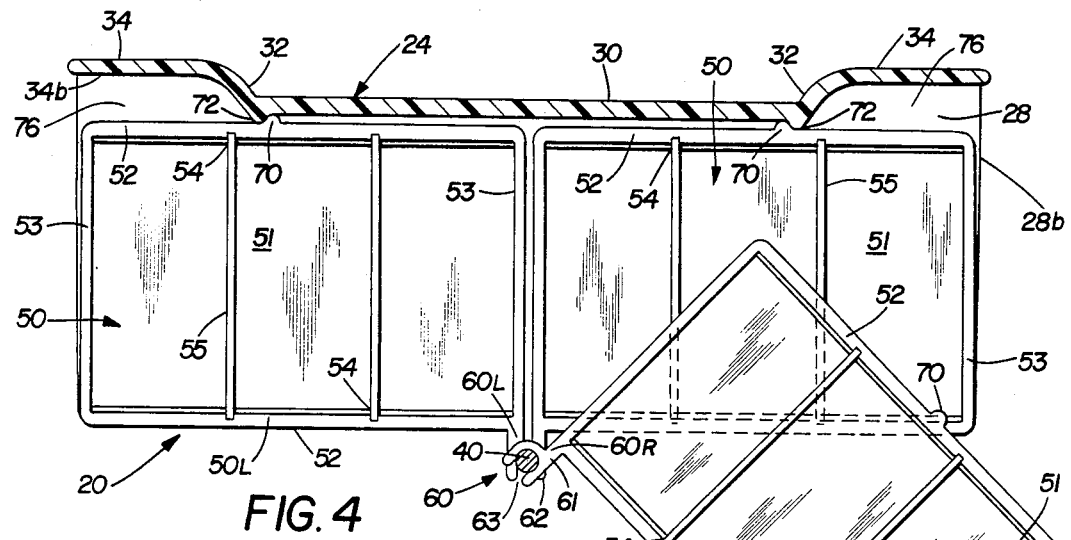
FIG. 4
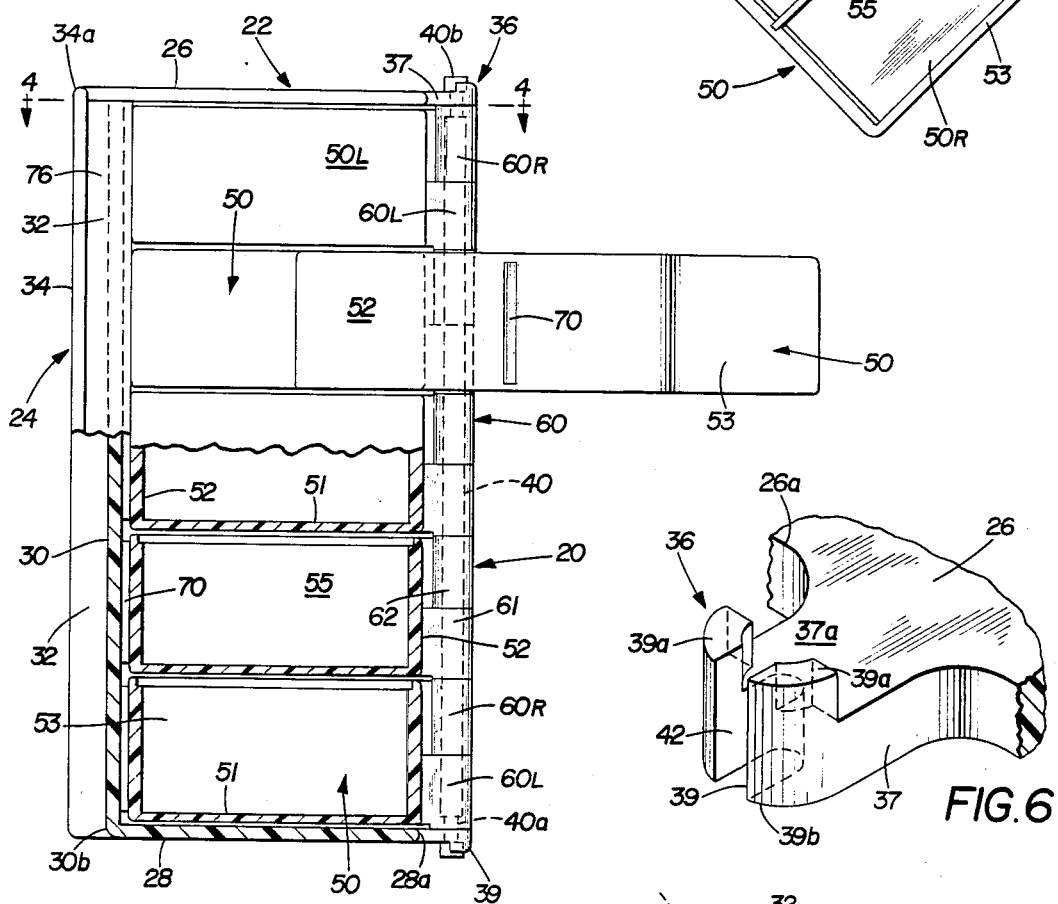
FIG. 5
FIG. 6
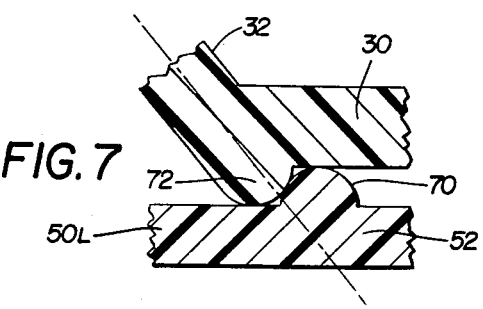
FIG. 7

FISHING TACKLE BOX

BACKGROUND OF THE INVENTION

1. Field of the Invention

The invention relates to a fishing tackle box or container and particularly to a fishing tackle box for storing and transporting a number of small items used by fishermen, such as artificial fishing flies, lures and small accessories. More particularly, the invention relates to a portable fishing tackle box or container that may be worn by a fisherman to carry such small items while fishing, and which can accommodate a wide selection or assortment of artificial flies, lures and accessories, all contained in a series of drawers which are mounted into a frame for carrying purposes. When mounted into the frame each drawer pivots to an open position allowing the simultaneous inspection of the contents of any two drawers for access to the contents. In addition, the drawers may be quickly and easily interchanged with an unlimited number of like additional drawers containing the balance of the fisherman's complete collection of artificial flies, lures and accessories so that the fisherman need carry only the mounted drawer that he deems necessary for that particular fishing period. Thus, the frame, mounted drawers, and additional like drawers which may be indexed in separate storage boxes are part of a complete system for organizing, storing and carrying flies, lures and accessories.

2. Description of the Prior Art

Fishermen who fish on streams and rivers typically carry with them a wide variety or assortment of fishing lures and accessories. Such fishermen usually wear a vest, shirt, or jacket, which is outfitted with a large number of pockets to accommodate a substantial number of small fishing tackle boxes that fit into the garment pockets.

It is common for stream fishermen, and particularly those fishing for trout, and related species, to attempt to simulate the natural food being eaten by the fish at the time that the fisherman is in the stream. Since aquatic insect life is one of the most common forms of food consumed by trout, artificial fishing flies that attempt to simulate the aquatic insect life in its various stages of development are most commonly used by trout fishermen when fishing with fly rods. The aquatic insect life being consumed by the fish can vary greatly in size, shape and color, depending on the date, the time of day, local stream conditions, and many otherfactors. Literally hundreds of artificial fly patterns could be used in the course of the fishing season to match the various insects and their various stages of development on which the fish selectively feed. However, since the active life period of a given aquatic insect is confined to a brief and predictable period, for example May 28 to June 10 for green drakes (ephemera guttulata) on northern Pennsylvania streams, the fly fisherman needs to carry on person only those fly patterns that are likely to match the active phases of specific aquatic life during the period that he is on the stream. Thirty or so fly patterns carried on person would usually meet the needs of most fishing situations.

Traditionally, fly fishermen carry in their vest or shirt pockets a number of fly boxes, each containing a broad assortment of flies. Each box may contain many fly patterns that are not applicable to the actual needs of the day. As a practical matter these excess flies are usually not sorted out and replaced by more applicable flies because of the time-consuming nature of the work.

Compounding the problem, the fisherman must, in the frequent course of changing flies in midstream, retrieve his line, tuck the rod under his armpit, clip off the fly, search through pockets to find the box in which the used fly is to be stored, open the box and insert the used fly, replace the box into the same pocket, possibly search through several other pockets, perhaps opening and closing several other boxes in the process of selecting the fly that he wishes to use, remove the selected fly, close and replace the box into the same pocket in which it was stored, tie on the new fly and proceed with his fishing. Since an open clam shell type, hinged fly box is usually balanced in one hand, the fisherman occasionally drops the box or spills the contents into the stream. Obviously this is an awkward process requiring, as some say, a third hand.

In response to this problem, various fishing tacke boxes of many types have been constructed that may be small and portable enough to be worn by the fisherman during the time that he is fishing so that more convenient access to the contents of the box may be had by the fisherman. A simple form of such a fishing tackle box is a small container which may be clipped or otherwise attached to the fisherman's belt. Such boxes normally include a hinged lid so that the fisherman may gain access to the contents of the box and then replace the cover of the box after removing from the box that item which the fisherman desires to use. Some of these boxes have been provided with multiple compartments.

Another form of a fly tackle box which provides storage space for a large number of items in a number of lure or fly compartments is shown in Fye U.S. Pat. No. 2,539,302. This patent discloses a portable fishing tackle box that is worn by the fisherman by means of a harness-like type of device which extends around the shoulders of the fisherman and maintains the box in approximate chest position on the front of the fisherman's body. The box includes a plurality of trays which are all hinged together and each tray has a hinged lid. The trays of the box shown in this reference are normally carried in vertical position and when access to one of the trays is desired, a snap catch is released to allow the specific tray desired to be rotated 90° to horizontal position. The hinged lid of the tray is then opened to gain access to the contents of the compartment of the tray. However, because the trays are carried in vertical position and moved to horizontal position to gain access, the contents within each compartment or tray may become mixed.

It is very common for a stream fisherman to possess a substantial number of fishing lures exceeding the capacity of such portable boxes. Accordingly, if such fisherman desires to take with him during a fishing trip those lures which are not at the time stored in the box, he must remove some or all of the contents of the box and replace them with those items which he desires to have for that particular fishing trip. Another method of accommodating this problem is to provide a plurality or number of additional trays which could be added to or substituted for trays present in the box. This requires either the addition of the tray adding to the bulk and horizontal projection of the unit, or the removal of one tray and its replacement with another tray by removing the hinges to permit substitution of the tray. This is an inconvenient procedure to accomplish the desired result with the type of box shown in Fye U.S. Pat. No.

2,539,302. Additionally, only the contents of one open tray may be viewed at a time so that if the fisherman wishes to inspect two specific flies that he is considering and these two flies happen to be in different trays, he must open, inspect, and close one tray and then repeat the process to inspect the other fly that he is considering.

Accordingly, a need exists for a small portable fishing tackle box or container that may be worn by a fisherman while fishing in which individual containers or drawers may be provided, which drawers are readily accessible to the fisherman while the fisherman is present at a fishing location. Additionally, such drawers or containers should be interchangeably mounted on the tackle box so that the fisherman may have the ability to change drawers conveniently either while fishing or prior to entering the stream. Further, the fisherman should be able to store his entire collection of lures in an unlimited number of like containers that may be indexed and easily interchanged with those worn on person, thus providing him with a complete system for the organizing, storing and carrying of lures and similar articles.

Further, such fishing tackle box should be of such construction that while being worn by a fisherman, access to the individual drawers and, therefore, to the contents of the drawers, may be had by using only one hand so that the other hand of the fisherman may be free to perform other fishing activities.

Further, it is desirable that such containers be of such a size and shape and weight that they are comfortable to wear and do not obstruct the hand and arm movement of the fisherman while fishing, particularly while attempting to manipulate a fly rod. Nor should it project from the chest to the extent that it obscures the fisherman's view of the stream bed while wading.

Other desirable features include the provision of means to attach the tackle box to a fisherman's body by either clipping it upon a fisherman's belt or by an around-the-neck lanyard, and at the same time providing means for attaching accessory items, such as fishing clippers, and other items that are normaly carried by a stream fisherman in a multi-pocketed garment.

It is also desirable that the tackle box have provision for positively holding the individual interchangeable drawers in a closed position, so that the contents of the drawers are not inadvertently spilled into the water while the fisherman is walking in a stream or bending over.

It is also desirable that the tackle box be suitable for use by fishermen in situations other than stream fishing. For example, surf fishermen may desire a portable tackle box having the aforementioned capabilities. Bass and panfish fishermen may also find such a box extremely convenient and useful.

Finally, it is desirable that the box be entirely suitable for uses other than fishing. Watch repairmen and other workers and hobbyists using small nuts, bolts and nails, such as model railroaders and other individuals, may conveniently use a storage box which is portable and easily worn by the user and which allows complete mobility and free use of the user's hands while at the same time providing easy and convenient access to the storage drawers while the box is being worn by the user.

SUMMARY OF THE INVENTION

Objectives of the invention include the provision of a fishing tackle box which is preferably constructed of moldable lightweight material such as plastic, in which the box includes a plurality of hinge-mounted drawers which are operable from open to closed position, in which positive latch means are incorporated to hold the drawers in closed position, in which the drawers may be moved from open to closed position with one hand of a user, in which the drawers are easily interchangeable with similar drawers so that spare drawers may be substituted for and interchanged with those mounted in the tackle box without changing the contents of the drawers, in which the drawers may be divided into smaller compartments, in which removable lids may be attached to the drawers to prevent spillage of the contents of the drawers when the drawers are removed from the box, in which means are provided for attaching the box to the belt, shirt or wader top of a user, in which means are provided for attaching a lanyard to permit the box being worn by around-the-neck suspension, in which the hinge mounting of the drawers is located at the front of the box with respect to the wearer's orientation to permit the swinging open of the drawers to fully expose the entire contents of a drawer when rotating or swinging to the open position, and in which the hinge position in respect to the drawer permits the user's simultaneous inspection of any two fully open and fully viewable drawers including two left, two right, or one left and one right drawer.

These and other objectives and advantages may be obtained by the improved fishing tackle box of the present invention, the general nature of which may be stated as including a box frame member of generally channel-shaped vertical cross section, the frame member including a back panel and having a top and bottom edge and a top panel member extending outwardly from the top edge and a bottom panel member extending outwardly from the bottom edge, the top and bottom panel members each terminating in outer edges, hinge pin mounting means located at the outer edge of the top and bottom panels, hinge pin means extending between the top and bottom hinge pin mounting means, and a plurality of drawers mounted for rotation on the hinge pin from between closed to open position. The back panel member also includes a pair of outwardly and rearwardly extending portions to provide an open space between the back panel and the drawers when the drawers are in closed position to allow insertion of a fisherman's finger between the drawers and the back panel to permit rotation of the drawers from closed to open position.

The fishing tackle box of the present invention preferably includes paired right-hand and left-hand drawers disposed opposite to one another when mounted on the hinge pin and preferably includes a plurality of pairs of drawers located adjacent to one another throughout the length of the hinge pin so that one or more pairs of drawers may be mounted on the tackle box if desired. The drawers of the tackle box of the present invention are detachably mounted to the hinge pin and are each provided with a cover or top to secure the contents when the drawer is not mounted into the frame and are sub-dividable into smaller compartments by removable panel members which can be placed within the interior of the drawer as desired by the user of the fishing tackle box to provide flexibility in varying the compartment size to best accommodate the size and number of flies, lures or accessories to be accommodated.

BRIEF DESCRIPTION OF THE DRAWINGS

A preferred embodiment of the present invention—illustrative of the best mode in which applicant has contemplated applying the principles—is set forth in the following description and shown in the accompanying drawings, and is particularly and distinctly pointed out and set forth in the appended claims.

In the drawings:

FIG. 1 is a perspective view of the improved fishing tackle box of the present invention illustrating five pairs of right and left-hand drawers with each of the drawers in closed position;

FIG. 2 is an exploded perspective view showing the frame member, hinge pin, belt clip, and one drawer, said drawer including in exploded position the top and subcompartment panel;

FIG. 3 is a rear elevation of the tackle box of FIG. 1;

FIG. 4 is a top plan view, partially in elevation, taken on the lines 4—4, FIG. 5, illustrating one of the drawers in partially open position;

FIG. 5 is a side elevation, partly in vertical section, illustrating another drawer in partially open position;

FIG. 6 is an enlarged fragmentary perspective view of the hinge pin mounting means located on the upper panel of the frame of the tackle box of the present invention; and FIG. 7 is a fragmentary section of the latch or catch means which holds the individual drawers in closed position.

Similar numerals refer to similar part throughout the various figures of the drawings.

DESCRIPTION OF THE PREFERRED EMBODIMENT

The improved fishing tackle box of the present invention is illustrated generally at 20 and includes a frame member 22 which is formed from a back panel generally indicated at 24, a top panel 26 and bottom panel 28. The back panel 24 includes a central panel portion 30, a pair of outwardly and rearwardly extending intermediate panel portions 32 and terminating in back panel outer portions 34. Central panel portion 30 and outward panel portions 34 lie in planes which are substantially parallel to each other. In cross section back panel portions 30, 32 and 34, as best seen in FIG. 4, assume a gull wing-like profile.

Each of the back panel portions 30, 32 and 34 terminate in top edges 30a, 32a and 34a and bottom edges 30b, 32b and 34b. Top panel member 26 projects outwardly in a forward direction, that is essentially perpendicular to the projection of intermediate panel portions 32 from the top edges 30a, 32a and 34a of the rear panel 24. Bottom panel 28, in similar fashion, projects outwardly forwardly from rear panel 24 from the bottom edges 30b, 32b and 34b.

Top panel 26 terminates in outer edge 26a and side edges 26b. Similarly, bottom panel 28 terminates in outside edge 28a and bottom panel side edges 28b. Hinge pin mounting means generally indicated at 36 projects outwardly from panel edges 26a and 28a. The hinge pin mounting means 36 on each of top panel 26 and bottom panel 28 are similar to each other but oppositely disposed to one another.

A hinge pin 40 is mounted to the frame and extends between the hinge pin mounting means 36 on the upper panel 26 and lower panel 28.

In accordance with the present invention, the frame 22 which includes rear panel 24, top panel 26 and bottom panel 28, is formed from an integral one piece molding, and rear panel 24 with its respective panel portions 30, 32 and 34 are of continuous structure.

Hinge pin mounting means 36, as best seen in FIG. 6, project outwardly from panel edges 26a and 28a and include an outwardly extending finger portion 37 and a pair of elongated hinge pin retaining bosses 39. A slot is formed through finger portion 37 and bosses 39.

Hinge pin 40 is formed of an elongated rod member and includes a neck portion 40a and head 40b formed at each end of the pin. The longitudinal dimension of neck portion 40a is slightly greater than the distance between the upper surface 39a and lower surface 39b of bosses 39, while the width of neck portion 40a is slightly smaller than the width of slot 42. The hinge pin 40 may thus be placed in the hinge pin retaining member 36 by inserting the neck portion 40a into the slot 42 with the head 40b being retained in the area between the upper surface of finger 37a on top panel 26 and the corresponding opposite surface 37a on the lower surface of bottom panel 28.

The hinge pin 40 is mounted for retention by hinge pin mounting means 36 by squeezing together, at the outer edges, top panel 26 and bottom panel 28 and slipping pin 40 with the neck area 40 passing into the respective slots 42 of the upper and lower hinge pin mounting means where head 40b is behind bosses 39. Compression is then released so that hinge pin 40 will be retained in mounted position extending between respective surfaces 37a with the head retained by bosses 39. Slot 42, being of smaller dimension than the diameter of head portion 40b, provides a positive means for mounting the pin in mounting position.

In accordance with the present invention the fishing tackle box is provided with a plurality of drawers which are mounted on hinge pin 40. A typical drawer is indicated generally at 50 in FIG. 2 and is of box-like configuration having a box bottom 51, opposite side walls 52 and end walls 53. Opposite side walls 52 may be provided with a plurality of grooves 54 which may receive divider panels 55 to subdivide each of the drawers into smaller compartments. The panels 55 are removable and may be simply slipped into grooves 54. In FIG. 4, each of the drawers 50 is illustrated as being subdivided into three compartments by using two divider panels 55 placed in their respective grooves 54. It should be understood, however, that the panels 55 need not be used, or only one may be used to divide drawers 50 in the desired number and size of compartments. Obviously, also, it is apparent that additional grooves and panels could be provided, depending on what is desired.

Each of the drawers 50 includes a hinge member generally indicated at 60 in FIG. 2. Hinge member 60 is generally Y-shaped in cross section and includes a vertically oriented hinge flange 61 and knuckle 62. Flange 61 and knuckle 62 define a re-entrant groove 63 which is generally oriented in vertical direction.

Hinge member 60 extends outwardly from a corner of drawer 50 and, because of the re-entrant character of grooves 63, the drawer 50 may be mounted on hinge pin 40 which is slightly greater in diameter, according to the present invention, than the opening of mouth re-entrant groove 63. Said re-entrant groove 63 provides the means by which drawer 50 may be easily removed or inserted into frame 22 without the need to remove pin 40 from frame 22. This may be accomplished by the spreading of the elastic hinge flange 61 and knuckle 62 to snap around hinge pin 40 as modest external force is applied to drawer 50 with appropriate alignment of the parts and the appropriate direction of the applied force.

As illustrated in the drawings, the fishing tackle box of the present invention includes a number of stacked pairs of drawers mounted on hinge pin 40. These stacked pairs extend throughout the length of hinge pin 40 and each pair consists of a right-hand drawer 50R and left-hand drawer 50L. Each of the pair of drawers 50R and 50L are located side-by-side with each pair stacked one upon the other. Thus, as shown in the drawings, ten individual drawers are mounted on the frame 24 and each of the drawers 50R and 50L are rotatable from open to closed position. In order to enable the side-by-side relationship of the drawers 50R and 50L, hinge 60 extends outwardly from the one corner of the drawer 50R and 50L approximately halfway along the length of the corner. Thus, a right-hand drawer 50R would have a hinge 60R extending outwardly from the upper half of the corner, while left-hand drawer 50L would have its hinge 60L extending from the lower half of the corresponding drawer 50L corner. Obviously, the positions of hinges 60R and 60L could be reversed, that is, the right-hand drawer hinge could extend from the lower half of the drawer, while hinge 60L could extend from the upper half of the drawer.

As described above, each of the drawers is removable from the hinge pin by snapping the hinge 60 over hinge pin 40. Therefore, the user of the container could have a number of extra drawers which could be interchanged with those mounted on the frame as shown in the drawings. For example, the user might have five extra right-hand drawers and five extra left-hand drawers. If he desired to take with him on a fishing trip those lures which were stored in excess drawers, he would remove one of the drawers mounted on the frame and replace it with a drawer which contained the lures which he desired to use at the time.

Each of the drawers 50, as described above, is rotatable from open to closed position. Because hinges 60 are located in a position extending outwardly from the corner of the drawer, at least two drawers may be rotated to open position to have their contents exposed at any one time. If, for example, two right-hand drawers were opened for exposure, one of the drawers would be rotated 180° and the other drawer would be rotated 90°. Thus, both drawers would be entirely in open position. Similarly, one left-hand drawer and one right-hand drawer may each be rotated 90° to open position and both of these drawers would be entirely available for access to inspect the contents of the drawers and to remove or replace items therein.

The fishing box construction of the present invention also includes a catch means for maintaining each of the drawers in closed position with a positive catch. The catch includes an elongated vertical rib 70 formed in the back panel of drawer 50 and an elongated vertical rib 72 formed at the intersection of frame back panel 30 and frame back panel portions 32. When a drawer is mounted on hinge pin 40, and rotated to closed position, rib 70 which projects from the drawer 50 toward back panel 30, engages and snaps behind rib 72 which projects inwardly toward the space defined by the back panel 30, top panel 26 and bottom panel 28. Because of the geometric location of hinge pin 40, an imaginary line drawn through the center of rib 72 (see FIG. 7) will permit the location of rib 70 to the inside of rib 72, that is toward the center or location of hinge 40. Thus, a drawer 50 rotated to closed position will, just prior to being closed, move rib 70 to engage rib 72 and snap into closed position with ribs 70 and 72 cooperating with each other as a positive catch.

When one or more of the drawers are located in closed position, back panel portions 30, 32 and 34 are constructed and arranged in such a manner that space 76 is defined between the back panel 52 of drawer 50 and frame back panel portions 32 and 34. This space permits the manipulation of drawer 50 by the hand of a user in that the user's finger or thumb may be inserted into space 76 to urge drawer 50 and rotate it to an open position.

The fishing box construction of the presented invention includes a belt clip 80 which is provided with a series of holes 82 which are spaced in such fashion as to cooperate with a series of holes 84 formed through frame back panel portion 30. Thus, belt clip 80 may be attached to the back panel portion 30 of the frame by a series of nut and bolt assemblies 86. The series of holes 84 formed through back panel 30 are such that the position of belt clip 80 may be changed with respect to its location along the height of back panel portion 30, or it may be rotated 90° so that belt clip 80 is located with a generally horizontal orientation.

This permits the user of the tackle box, with belt clip 80 mounted at the desired location, to attach the tackle box to his person in whatever convenient way he wishes. As seen in FIG. 3, belt clip 80 is slipped over the belt 88 of the fishing tackle box user.

A pair of slots 89 are formed in the upper portion 87 of belt clip 80 to provide a means of attaching additional accessories such as a flashlight to the tackle box by the tackle box user.

Additionally, the tackle box construction preferably includes a series of slots 90 formed through frame rear portion 34. This permits attachment of a lanyard 92 so that the user of the device may support the tackle box on his person by hanging the box around his neck with the lanyard.

Each of the components of the tackle box of the present invention, except hinge pin 40, that is frame 22, drawer 50 and belt clip 80, are preferably formed by a moldable plastic material such as Lexan, a commercial material available from General Electric Company. Other moldable plastic materials could be used and it is contemplated that the moldable material can be made in any suitable or desired color.

Hinge pin 40 is preferably made from stainless steel so that the elements to which the tackle box will be exposed will not have any harmful effect on the hinge pin.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved fishing tackle box is constructed, assembled and operated, the characteristics of the new construction, and the advantageous, new and useful results obtained; the new and useful structures, devices, elements, arrangements, parts, and combinations are set forth in the appended claims.

I claim:

1. A portable container for storing and transporting small articles such as fishing lures including a frame having a generally channel-shaped cross section, said frame including a back panel having a top edge and a bottom edge, a top panel extending from the top edge of the back panel and a bottom panel extending from the bottom edge of the back panel, said top panel and said bottom panel terminating in outside edges, the top panel edge being located above the bottom panel edge when the said back panel is oriented in the vertical position, top panel hinge pin mounting means located at the top panel edge and bottom panel hinge pin mounting means located at the bottom panel edge, said top panel hinge pin mounting means located vertically above the bottom panel hinge pin mounting means when said back panel is oriented in the vertical position, a removably mounted hinge pin extending vertically between and removably retained by the top panel hinge pin mounting means and the bottom panel hinge pin mounting means, said top panel edge and bottom panel edge being flexibly movable toward each other to permit removal of said hinge pin; said top panel, bottom panel and back panel defining a closed position drawer mounting space; at least one box-shaped drawer having front, back and side panels and a bottom panel, the drawer corner defined by the intersection of the drawer front panel and one of the drawer side panels having a hinge knuckle mounted on and extending outwardly from said drawer corner, said drawer being removably rotatably mounted on said hinge pin, said drawer being rotatable from closed position within the space defined by the top, back and bottom frame panels to open position away from the frame back panel, catch means located on the frame back panel, rib means formed on the drawer back panel for cooperation with said catch means, means mounted on the frame back panel for removably attaching the container to the body of a user, and said hinge knuckle including a reentrant groove defining an elongated slot adapted to snap over and removably engage the hinge pin.

2. Portable container construction as defined in claim 1 in which a space is defined by a portion of the drawer back panel and said frame back panel to permit engagement of the drawer by the hand of a user to rotate said drawer from closed to open position and in which a plurality of drawers are mounted on the hinge pin in stacked relationship one upon the other and located between the frame top panel and bottom panel when said drawers are in closed position.

3. Portable container construction as defined in claim 2 in which said catch means includes a vertically oriented elongated rib formed on the back panel of the frame which cooperatively engages said rib formed on the back panel of the drawer and in which said hinge pin mounting means includes an outwardly extending finger having a boss at the outer end of the finger, and an elongated slot formed through said boss and said finger and in which said hinge pin includes an upper and lower neck portion adapted to be removably received in said slot, and said hinge pin including upper and lower heads adapted to engage the boss on said hinge pin mounting means when said top and bottom panel outer edges are in unflexed position.

4. A portable container for storing and transporting small articles such as fishing lures including a frame having a generally channel-shaped cross section, said frame including a back panel having a top edge and a bottom edge, a top panel extending from the top edge of the back panel and a bottom panel extending from the bottom edge of the back panel, said top panel and said bottom panel terminating in outside edges, the top panel edge being located above the bottom panel edge when said back panel is oriented in the vertical position, top panel hinge pin mounting means located at the top panel edge and bottom panel hinge pin mounting means located at the bottom panel edge, said top panel hinge pin mounting means located vertically above the bottom panel hinge pin mounting means when said back panel is oriented in vertical position, a removably mounted hinge pin extending between and removably retained by the top panel hinge pin mounting means and the bottom panel hinge pin mounting means, said top panel edge and bottom panel edge being flexibly movable toward each other to permit removal of said hinge pin; said top panel, bottom panel and back panel defining a closed positioned drawer mounting space; a plurality of box-shaped drawers having front, back and side panels and a bottom panel, the drawer corner defined by the intersection of the drawer front panel and one of the drawer side panels having a hinge knuckle mounted on and extending outwardly from each of said drawer corners, said drawers being removably rotatably mounted on said hinge pin, said drawers being rotatable from closed position within said space defined by the top, back and bottom frame panels to open position away from the frame back panel, said plurality of drawers being located in stacked relationship, one upon the other, when said drawers are located within the space defined by said frame bottom panel, frame back panel, and frame top panel; elongated, vertically disposed catch means located on the frame back panel, rib means formed on each drawer back panel for engagement with said catch means when each drawer is in closed position, means mounted on the frame for attaching the container to the body of a user, and each of said hinge knuckles including a reentrant groove defining an elongated slot adapted to snap over and removably engage the hinge pin.

5. Portable container construction as defined in claim 4 in which a plurality of pairs of drawers are located in stacked relationship one upon the other, each of said pairs being located in side-by-side relationship to one another and in which each of said pairs includes a righthand and a lefthand drawer and in which said righthand drawer hinge knuckles and lefthand drawer hinge knuckles are staggered with respect to each other to permit each of the righthand and lefthand drawers to be located side-by-side with respect to each other.

6. Portable container construction as defined in claim 5 in which a space is defined by the drawer back panel and the frame back panel to permit engagement of the drawer by the hand of the user to rotate said drawer from closed to open position and in which any two drawers may be simultaneously rotatable to open position.

7. Portable container construction as defined in claim 5 in which said catch means includes a pair of elongated ribs.

* * * * *